Dec. 5, 1939. C. KALBFELL 2,182,439
DETACHABLE INTERCONNECTING CHAIN LINK
Filed Aug. 30, 1939
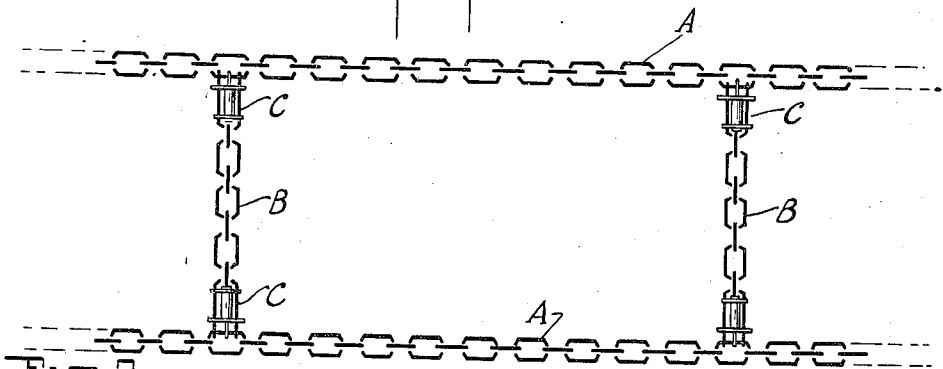
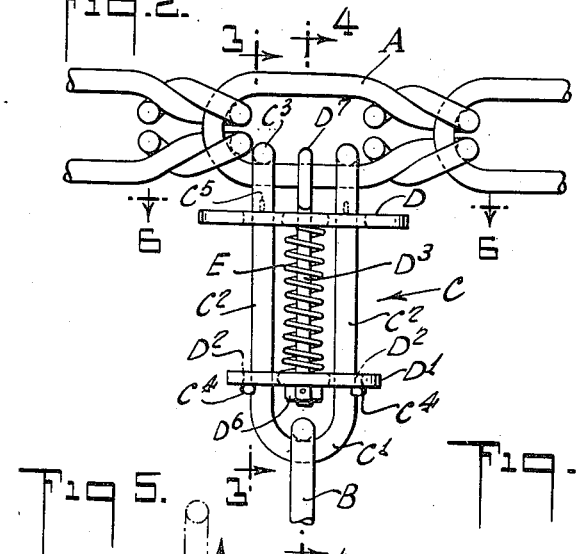
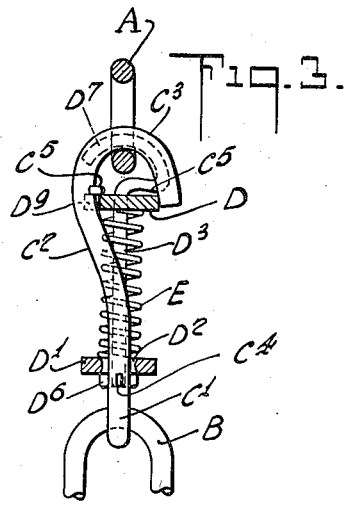
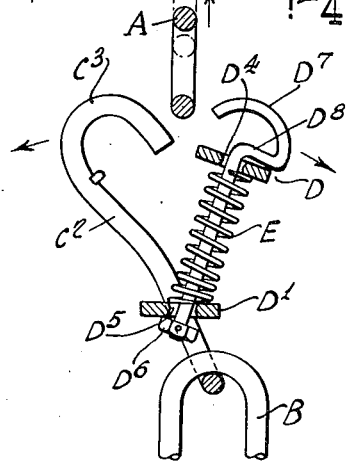
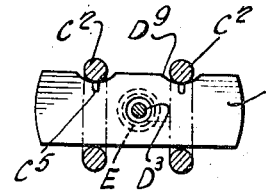
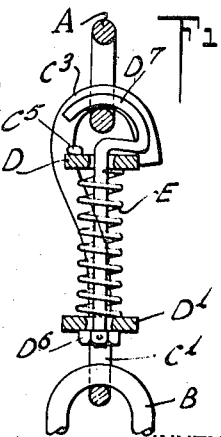
INVENTOR
Charles Kalbfell
BY
Morrison, Kennedy & Campbell
ATTORNEYS Patented Dec. 5, 1939

2,182,439

UNITED STATES PATENT OFFICE 2,182,439

DETACHABLE INTERCONNECTING CHAIN LINK

Charles Kalbfell, New York, N. Y.

Application August 30, 1939, Serial No. 292,557

9 Claims. (Cl. 59—93)

This invention relates to a device for detachably interconnecting links of chain as, for instance, the cross links of an automobile anti-skid chain with the lateral chains thereof that extend circumferentially of the wheel.

It is common knowledge that the cross links of automobile anti-skid chains, because of the severe service to which they are subjected, often break, leaving loose ends which strike against the metal parts of the vehicle and occasion considerable annoyance. While it is possible to remove the broken cross links from the lateral chains, this is rather difficult of accomplishment without special tools and particularly when the vehicle is in service on the road.

According to the present invention, an improved interconnecting link is provided which greatly facilitates the disconnection of the broken cross links from the lateral chains and the substitution therefor of a new set of cross links.

The improved interconnecting link consists of a U-shaped member having a base portion and two side portions, the free ends of which are bent in the form of a hook somewhat similar to a standard connecting link, except that the hook end portions are left open so as readily to be passed through a link of one of the chain portions to be connected together. The open hook portion also permits the improved link to be passed through a link of the other chain portion, which link in service will be located at the base of the U. When the two chain portions are connected as just described, the open hook portions of the interconnecting link are closed by a crossplate resiliently urged therein by means of a spring abutting against another crossplate, spaced therefrom and mounted upon the side portions of the interconnecting link, which crossplate, in turn, abuts against upset protrusions formed on the interconnecting link near the base thereof. The spring is located centrally of the side portions and encircles a rod extending through centrally located apertures in the spaced crossplates, thus serving to properly position the spring. At the end remote from the hook portion, the rod may be provided with a nut reacting against the adjacent crossplate while, at its other end, the rod is bent in the form of a hook which passes through the same link element as the hook portions of the connecting link but in the opposite direction.

In order to disconnect the chain portions, held together by the interconnecting link, it is necessary only to push the hook closing crossplate against the reaction of the associated spring until it clears the hook-shaped portions on the U-shaped member. The hook-shaped rod is then swung free of the link in the chain portion connected at that end and the link removed. The entire spring assembly is then removed from the U-shaped member leaving the latter free to be disengaged from the link of the other chain portions to which it is connected.

Referring to the drawing:

Fig. 1 illustrates diagrammatically a portion of an automobile anti-skid chain with cross links connected to the lateral chain portions by means of the improved interconnecting link;

Fig. 2 is an enlarged view of one of the interconnecting links shown in Fig. 1;

Fig. 3 is a vertical sectional view taken on line 3—3 of Fig. 2;

Fig. 4 is a vertical sectional view taken on line 4—4 of Fig. 2;

Fig. 5 is a sectional view similar to Fig. 4 but illustrating the manner in which the link is disconnected from one of the chain portions; and Fig. 6 is a horizontal sectional view on line 6—6 of Fig. 2.

As shown in Fig. 1, the usual automobile anti-skid chain includes two lateral chain portions A interconnected at suitably spaced intervals with smaller cross chain portions B which, in service, pass around the tire from bead to bead. It is proposed to interconnect the cross chain portions with the lateral chain portions by means of the improved interconnecting link C, one of said links being provided at each end of the cross chain portions in order that the latter may be readily removed and replaced.

As shown in Figs. 2 and 3, the improved link C is substantially U-shaped and consists of a base portion $C^1$, and side portions $C^2$, the latter being formed at their free ends with open hook-shaped portions $C^3$. In service, a link of the cross chain B is interlinked with the U-shaped member at the base of the latter, whereas the hook-shaped portions $C^3$ pass through a link of a lateral chain portion A. Instead of being bent to form a closed loop, as is usually the case, the hook portions $C^3$ are closed by a crossplate D located at one end of a hook closing assembly which, in addition to the crossplate D, includes a lower crossplate $D^1$ formed with spaced holes $D^2$ through which the side members $C^2$ of the U-shaped member pass, a rod $D^3$ extending through centrally located apertures $D^4$ and $D^5$, one in the upper and one in the lower crossplate and which is threaded at its lower end to receive a nut $D^6$ reacting against the lower crossplate at the bottom and formed at its upper end with an open hook $D^7$, a portion $D^8$ of which is offset laterally so as to provide an abutment for the upper crossplate D. The assembly further includes a compression spring E encircling the rod $D^3$ and reacting between the upper and lower crosspieces D and $D^1$.

The upper crossplate D, as shown best in Fig. 6, is notched as at $D^9$ where it engages the side members $C^2$ of the U-shaped portion in order to prevent lateral movement of the crossplate with respect thereto.

When the improved interconnecting link is in service (see Figs. 2, 3 and 4), the lower crossplate $D^1$ reacts against abutments $C^4$ formed on the side members $C^2$ near the lower ends thereof. The upper crossplate likewise reacts against similar abutments $C^5$ formed on the inner opposed surfaces of the hook-shaped portions $C^3$. In order to make sure that the two crossplates D and $D^1$ react directly against portions of the U-shaped member itself, the length of the rod $D^3$ between the nut $D^6$ and the lateral offset portion $D^8$ thereof is slightly larger than the distance between the upper and lower abutments $C^4$ and $C^5$ formed on the U-shaped member. The clearance thus provided will allow the rod $D^3$ to slide slightly in an endwise direction and with respect to the crossplates D and $D^1$ when the device is in service, but the degree of movement will not be so great to permit the outer or free end of the hook-shaped portion $D^7$ on the rod to clear the link of the chain portion A.

In order to detach the respective chain portions from the improved link, it is necessary merely to pull down upon the upper crossplate D until the latter clears the hook-shaped portions $C^3$ on the link, the upper crossplate for this purpose being extended sufficiently beyond the side members $C^2$ of the link to permit it to be gripped readily by two fingers of the hand. When the crossplate D is clear of the hook portions $C^3$, the spring assembly is swung angularly with respect to the U-shaped link member as shown in Fig. 5 until the hook $D^7$ on the rod $D^3$ clears the link of the lateral cross chain A. This link can then be slipped off the hook portions $C^3$ and thus removed. The hole $D^5$ in the lower crossplate through which the rod $D^3$ extends as well as the holes $D^2$ for the side members $C^2$ of the link are of a size to permit an angular displacement giving sufficient clearance for the removal of the link of the chain portion A. After this link has been disconnected, the spring assembly is removed from the U-shaped link member by sliding the lower crossplate $D^1$ up along the side members thereof and thence off the ends of the hook portions $C^3$. When this has been accomplished, the link of the cross chain B may readily be removed. In order to substitute a new cross chain portion for that removed, the operations just given are merely reversed. It will be understood, of course, that the abutments $C^5$ on the hook-shaped portions of the link, against which the upper crossplate D reacts, will not be so large as to prevent the passage of the lower crossplate $D^1$ thereon during removal and replacement.

While it is rather improbable, nevertheless there is the possibility that during service deep snow or some other obstruction might tend to press the upper crossplate D in a manner causing it accidentally to clear the ends of the hook-shaped portion $C^3$ of the link. However, should this occur, the improved link would not become detached from the lateral chain, because of the presence of the hook portion $D^7$ of the rod $D^3$ which, as shown in the drawing, has its opening facing in the direction opposite to that of the openings of hooks $C^3$. As a further safety measure, the spring E may be encased in a rubber sleeve to prevent the access of ice and snow thereto which otherwise might interfere with the proper functioning of said spring.

It will be understood, of course, that means other than a nut at the end of the rod $D^3$ could be used to react against the bottom of the lower crosspiece $D^1$, the threaded rod and nut being shown merely by way of example and for ease in assembling. If desired, a transverse pin passing through the nut and the rod could also be employed in order to prevent the inadvertent removal of the nut from the rod.

In the accompanying drawing, the invention has been shown merely by way of example and in preferred form, and obviously many variations and modifications may be made therein which will still be comprised within its spirit. It is also obvious that the improved interconnecting link could also be used for detachably interconnecting portions of chain other than those used for anti-skid purposes. It is to be understood, therefore, that the invention is not limited to any specific form or embodiment, except insofar as such limitations are specified in the appended claims.

Having thus described my invention, what I claim is:

1. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly including a plate movably mounted on the side portions of said U-shaped member, a second plate, and an intermediate spring urging the first mentioned plate against an abutment on the U-shaped member and the second mentioned plate into a position to close the hook-shaped portions thereof, and said assembly also including a bar encircled by said spring and passing through holes in said plates, said bar having means at the ends thereof for locating the bar with respect to said plates and being formed at one end with a hook portion adapted to hook through the same chain link as the hook portions of the U-shaped member but in a direction opposite thereto.

2. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly including a plate movably mounted on the side portions of said U-shaped member, a second plate, and an intermediate spring urging the first mentioned plate against an abutment on the U-shaped member and the second mentioned plate into a position to close the hook-shaped portions thereof, and, said assembly also including a bar encircled by said spring and passing through holes in said plates, said bar having means at the ends thereof for locating the bar with respect to said plates and being formed at one end with a hook portion adapted to hook through the same chain link as the hook portions of the U-shaped member.

3. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly including a plate movably mounted on the side portions of said U-shaped member, a second plate, and an intermediate spring urging the first mentioned plate against an abutment on the U-shaped member and the second mentioned plate into a position to close the hook-shaped portions thereof, and said assembly also including a bar encircled by said spring and passing through holes in said plates and having means at the ends thereof for locating it with respect to said plates.

4. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly including a plate movably mounted on the side portions of said U-shaped member, a second plate, and an intermediate spring urging the first mentioned plate against an abutment on the U-shaped member and the second mentioned plate into a position to close the hook-shaped portions thereof, and said assembly also including means for maintaining the spring in operative position with respect to said plates.

5. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly including a pair of plates and an intermediate spring reacting therebetween to urge one plate against abutment means on the U-shaped member and the other plate into a position to close the hook portions thereof.

6. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly removably mounted on the U-shaped member and including a plate for closing the hook portions thereof and means for resiliently urging said plate to hook closing position.

7. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly removably mounted on the U-shaped member and including a plate for closing the hook portions thereof, means for resiliently urging said plate to hook closing position and means for preventing lateral movement of said plate with respect to the U-shaped member.

8. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly removably mounted on the U-shaped member and including spring means reacting between portions of said member to close the open hook portions thereof.

9. A device for detachably interconnecting links of different chain portions, the same including, in combination, a U-shaped member adapted to be interlinked with a link of one chain portion and having side portions formed at their free ends with relatively open hooks adapted to hook through the link of another chain portion, and a hook closing assembly removably mounted on the U-shaped member and adapted when in service resiliently to close the hook portions thereof.

CHARLES KALBFELL.